B. F. McGUINESS.
LOOM.
APPLICATION FILED JAN. 2, 1907.

937,165.

Patented Oct. 19, 1909.
10 SHEETS—SHEET 1.

Fig. 1.

Witnesses
M. Bredt.
M. Haas.

Inventor
Benj. F. McGuiness.
By J. E. Dewey
Attorney.

B. F. McGUINESS.
LOOM.
APPLICATION FILED JAN. 2, 1907.

937,165.

Patented Oct. 19, 1909.
10 SHEETS—SHEET 7.

Witnesses
M. Bredt.
M. Haas.

Inventor
Benj. F. McGuiness
By J. E. Dewey
Attorney.

UNITED STATES PATENT OFFICE.

BENJAMIN F. McGUINESS, OF WORCESTER, MASSACHUSETTS, ASSIGNOR TO CROMPTON & KNOWLES LOOM WORKS, A CORPORATION OF MASSACHUSETTS.

LOOM.

937,165.        Specification of Letters Patent.        Patented Oct. 19, 1909.

Application filed January 2, 1907. Serial No. 350,336.

*To all whom it may concern:*

Be it known that I, BENJAMIN F. Mc-GUINESS, a citizen of the United States, residing at Worcester, in the county of Worcester and State of Massachusetts, have invented certain new and useful Improvements in Looms, of which the following is a specification.

My invention relates to looms, and particularly to that class of looms termed fancy looms, with one or more drop or change shuttle boxes at one or both ends of the loom, and having a Knowles head motion, so-termed, comprising upper and lower cylinder gears, intermediate vibrator gears, vibrator levers operated by a box pattern chain, and vibrator connectors to the levers of the box motion, all as fully shown and described in U. S. Reissue Letters Patent No. 7,784.

My invention particularly relates to shuttle changing mechanism, and to indicating mechanism operated by the weaver, and adapted to be combined with the ordinary Knowles head motion above referred to, and other parts of a loom, of the class referred to, of ordinary construction, and by means of which any shuttle, having its filling practically or substantially exhausted, may be automatically exchanged for a shuttle having a full supply of filling of the same character or color, without stopping the loom.

The object of my invention is to provide a shuttle changing mechanism, and an indicating mechanism, to be combined with said Knowles head motion, and the other parts of a loom, of the class referred to, of the ordinary construction and operation, and by means of which the loom may be made a continuously running loom, the supply of new filling, in case of the practical or substantial exhaustion of filling in any of the shuttles, being controlled by the weaver, through manually operated indicating mechanism, which puts into operation the mechanism for automatically effecting the exchange of the shuttle desired, and the supply of a new shuttle.

In my improvements, I provide two supplemental or extra shuttle-boxes or cells, preferably arranged one directly over the other, at one end of the loom. The top cell is preferably for the spare shuttle, which is to take the place of the shuttle to be exchanged, and this shuttle is placed in its cell by the weaver. The other or lower cell is preferably to receive the shuttle to be exchanged. These two shuttle cells are additional to the ordinary shuttle cells, and in the normal operation of the loom are preferably not connected with the ordinary shuttle-boxes or cells, to move back and forth with the lay, but are connected with them to be raised and lowered, and to maintain their same relative position. In case it is desired to exchange a shuttle, in case of the practical or substantial exhaustion of the filling therein, or for any other reason, the two supplemental shuttle cells are connected with the ordinary shuttle-boxes or cells at one end of the loom, by the weaver, to move with them and with the lay, the weaver having first placed in the cell for the spare shuttle, a shuttle having filling therein of the same color or character as the filling in the shuttle to be exchanged. The weaver then operates the indicating lever, or other device of the indicating mechanism, for the shuttle-box or cell which contains the shuttle to be exchanged, and when said shuttle-box is on a line with the race-way of the lay, preparatory to the picking of the shuttle therefrom, the supplemental empty shuttle cell is brought on a line with the race-way, to receive the shuttle to be exchanged, and then according to the call of the box pattern chain, the supplemental shuttle cell containing the spare shuttle is brought on a line with the race-way, to have the spare shuttle picked from said cell, through the movement of sliding runs on the ordinary vibrator levers of the shuttle-box portion of the head motion, which form a part of my improvements, and mechanism, the action of which is controlled by a pattern indicator on the box pattern chain, for operating, at the proper time, the mechanisms for moving the sliding runs.

My invention consists in certain novel features of construction of my improvements as will be hereinafter fully described.

I have only shown in the drawings detached portions of a loom of the class referred to, having the Knowles head motion, with my improvements in shuttle changing mechanism, and indicating mechanism applied thereto, sufficient to enable those skilled in the art to understand the construction and operation thereof.

Referring to the drawings: Fig. 5ª shows the opposite side of the cam shown in Fig. 5.

In the accompanying drawings, 1 are the loom sides or end frames, 2 the breast-beam, 3 the lay carried on the lay-swords 4, 5 the shuttle-box-guide frames at each end of the lay, 6 the ordinary change or drop shuttle-boxes on the left hand end of the loom, in this instance four in number, and mounted on the vertically moving box rod 7, which is connected at its lower end to the rocker iron 8, and has the helically coiled expansion spring 7ª thereon, and is raised and lowered in the usual way, through connections, not shown, to the box pattern chain.

6' are the ordinary change or drop shuttle-boxes, in this instance two in number, on the right hand end of the loom, and mounted on a vertically moving box rod 7', which is connected at its lower end to the rocker iron 8', and has the helically coiled expansion spring 7" thereon, and is raised and lowered, through connections, not shown, to the box pattern chain.

9 is the loom arch, 10 the head motion stand or frame supporting the several parts of the head motion of the well known Knowles type, shown and described in U. S. Reissue Letters Patent No. 7,784, above referred to, and comprising an upper cylinder gear 11, a lower cylinder gear 12, a vibrator gear 13, mounted and rotatable upon the vibrator lever 14, and vibrator connector 15 to the shuttle box levers, not shown. The upper and lower cylinder gears 11 and 12 are rotated in the usual way through an upright shaft and gear connection, not shown.

Through the gear connection from the lower cylinder gear shaft 12', the gear 16, fast on the pattern cylinder shaft 17 is rotated. The pattern cylinder shaft 17 carries the pattern cylinder or barrel 18, Fig. 2, for the pattern chain, not shown, of the harness motion, not shown, and also carries the pattern cylinder or barrel 19, having thereon the pattern chain 20, made up of bars 20' connected by links, and carrying rolls 20", and tubes 20''', see Fig. 2, in the usual way.

All of the above mentioned parts may be of the usual and well known construction in looms of the class referred to, having a plurality of change or drop shuttle-boxes at one or both ends of the loom.

I will now describe my improvements, adapted to be combined with the parts above mentioned, and by means of which the loom may be made a continuously running loom, and any shuttle, when the filling therein is practically or substantially exhausted, may be automatically exchanged for another shuttle with a fresh supply of filling of the same color or character, without stopping the loom, through shuttle changing mechanism, and indicating mechanism operated by the weaver.

I have shown in the drawings, Fig. 1 to Fig. 16, my improvements for two ordinary drop or change shuttle boxes or cells at one end of the loom and one box at the other end of the loom, but my improvements may be used with two or more ordinary drop or change shuttle-boxes at each end of the loom; it is only necessary to duplicate some of the parts of my mechanism. In this instance I combine with the two ordinary drop or change shuttle-boxes 6' on the right hand end of the loom, two supplemental boxes or cells 21, and 22, one (the upper one,) to contain preferably the spare shuttle, to take the place of the shuttle to be exchanged, and the other to receive preferably the shuttle to be exchanged. The two supplemental shuttle-boxes or cells 21 and 22 are preferably arranged one directly over the other, and are in this instance carried on the upper end of a swinging or pivotally mounted lever 23, see Fig. 16, having its upper end provided with an operating handle 23', to be grasped by the weaver, and its lower end, preferably made of fork shape, see Fig. 1, pivotally mounted on a collar 24 secured on the lower end of the vertically moving box lifter rod 7', to move up and down therewith. The swinging lever 23 is guided and held in position laterally by a guide stand 23'', attached to the end frame 1, see Fig. 1.

Figure 14:
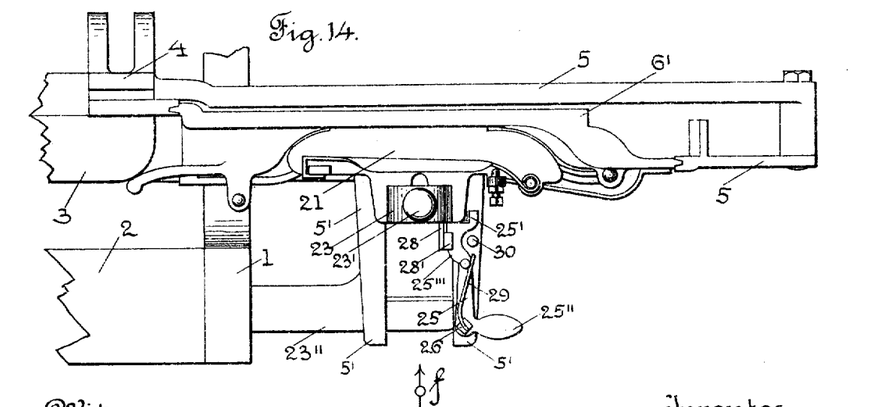
Fig. 14 is a plan view of the parts shown in Fig. 13, looking in the direction of arrow g, same figure.
Figure 15:
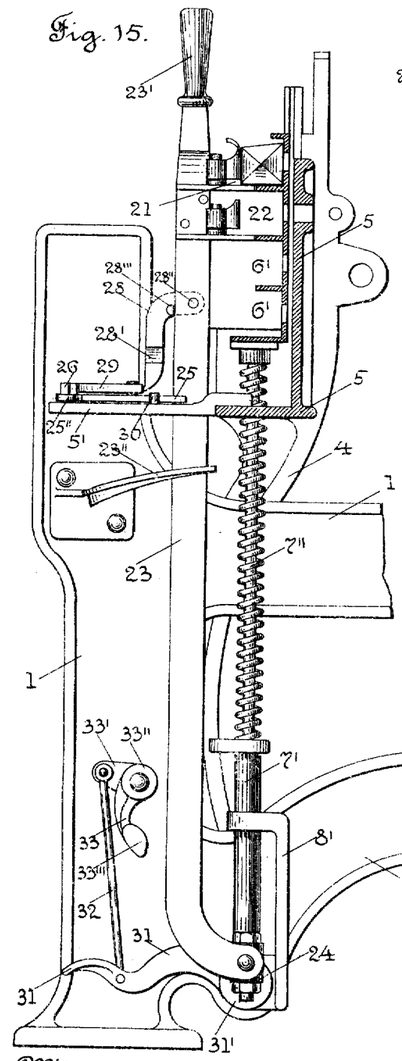
Fig. 15 is, on an enlarged scale, a section, on line 15, 15, Fig. 1, looking in the direction of arrow h, same figure.
Figure 16:
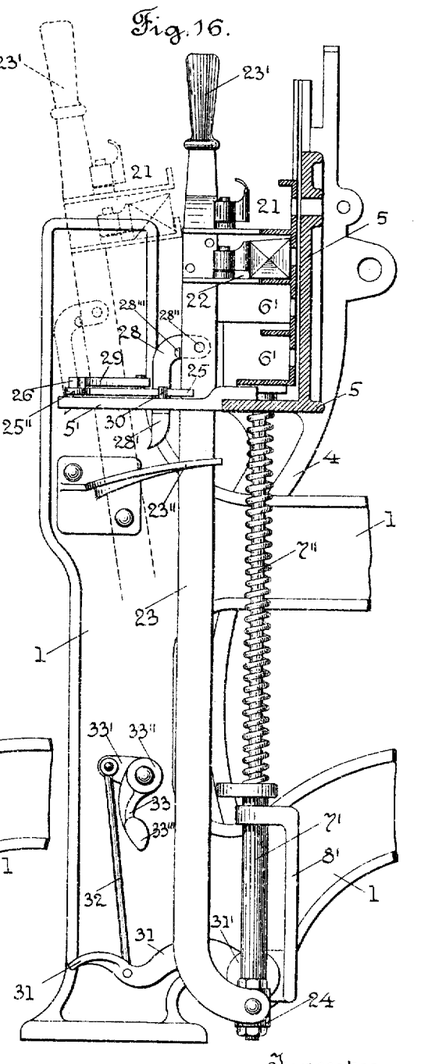
Fig. 16 corresponds to Fig. 15, but shows some of the parts in a different position, and also shows by broken lines the supplemental shuttle cells detached, and in their normal inoperative position.

In the normal operation of the loom, the lever 23, carrying the supplemental shuttle-boxes 21 and 22, is preferably disconnected from the ordinary shuttle-boxes 6', and extends in an inclined position toward the front of the loom, as shown by broken lines in Fig. 16, and remains in this position, preferably by gravity. In case it is desired to exchange one of the shuttles when the loom is in operation, on account of the practical or substantial exhaustion of the filling therein, then a shuttle having a filling of a similar character or color is placed in the spare shuttle cell 21, in this instance the upper cell of the two supplemental cells 21 and 22, and the lever 23 is moved forward by the weaver, through the handle 23', until the two supplemental shuttle-boxes 21 and 22 are in vertical alinement with the two ordinary shuttle-boxes or cells 6', when by means of a suitable locking device, in this instance consisting of a spring actuated latch 25 mounted on one arm of the two guide arms 5' for the lever 23, which arms 5' extend outwardly from the front side of the lower end of the shuttle guide frame 5, see Figs. 14 and 15, the lever 23 and the supplemental boxes 21 and 22 are locked to the ordinary shuttle-boxes 6', and move up and down therewith. The locking latch 25, see Fig. 14, is in this instance pivotally mounted on a stud 26 on one arm 5', and locks the swinging lever 23, by engaging one of its forked sides with its recessed end 25', see Fig. 14. A spring 29 actuates the latch 25, which has a handle 25'' thereon to move said latch. A pin 30 limits the outward pivotal movement of the inner end of the latch 25.

Figure 13:
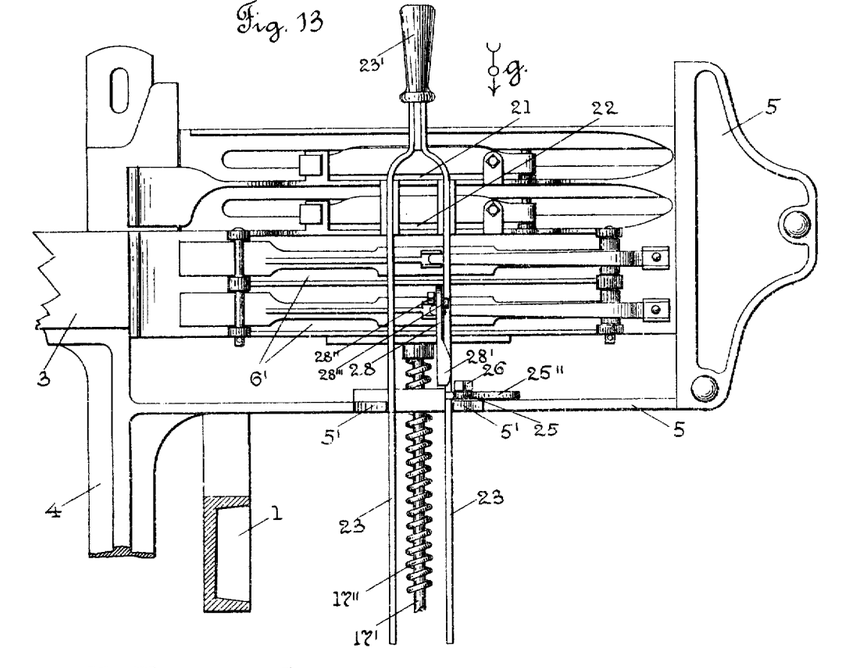
Fig. 13 shows, on an enlarged scale, the two ordinary shuttle-boxes, and the other mechanism shown at the right in Fig. 1, and is a front view of the parts shown in Fig. 14, looking in the direction of arrow f, same figure.

In connection with the locking latch 25, to lock the lever 23, and hold the supplemental boxes or cells 21 and 22 in alinement with the ordinary boxes 6', I provide means for automatically operating the locking latch 25, to release the lever 23 and allow it to return into its forward position, shown by broken lines in Fig. 16, on the forward beat of the lay, after the spare or new shuttle has been picked from its cell 21. In this instance I employ a downwardly extending arm 28, which is pivotally supported at its upper end, on a pin or stud 28'' on one arm of the lever 23, and extends out from the front edge of the lever, see Figs. 13, and 15. A knob or projection 28''' on the arm 28, engages the outer edge of one arm of the lever 23, see Fig. 13, and limits the inward pivotal movement of the arm 28. The lower end of the arm 28 is curved outwardly on its inner edge, and made pointed, and there is a cam shaped projection 28' on its outer side.

In the downward movement of the shuttle boxes, from the position shown in Fig. 15, to the position shown in Fig. 16, to bring the upper supplemental cell 21 on a line with the race-way, to have the spare shuttle picked therefrom, the arm 28, engaging at its lower end the inner curved edge 25''' of the locking latch 25, see Fig. 14, is moved outwardly, until the cam shaped projection 28' passes by the curved extension 25''' on said latch 25, and then the arm 28 drops back into its normal position, as shown in Fig. 16, with the cam shaped projection 28' under the locking latch 25, so that when the boxes are raised, after the spare shuttle is picked, the upward movement of the arm 28 on the lever 23, will, through the cam projection 28' on said arm 28 engaging the locking latch 25, move outwardly said latch, and automatically unlock and release the lever 23, and allow it with the supplemental boxes 21 and 22, to return to its normal position, shown by broken lines in Fig. 16, on the next forward beat of the lay. As stated above, the upper supplemental box or cell 21 receives the new or spare shuttle from the hand of the weaver, when the lever 23 and the boxes 21 and 22 are in their inoperative position, and the supplemental box or cell 22 is to receive, from the other side of the loom, the shuttle to be taken out or exchanged.

Figure 1:
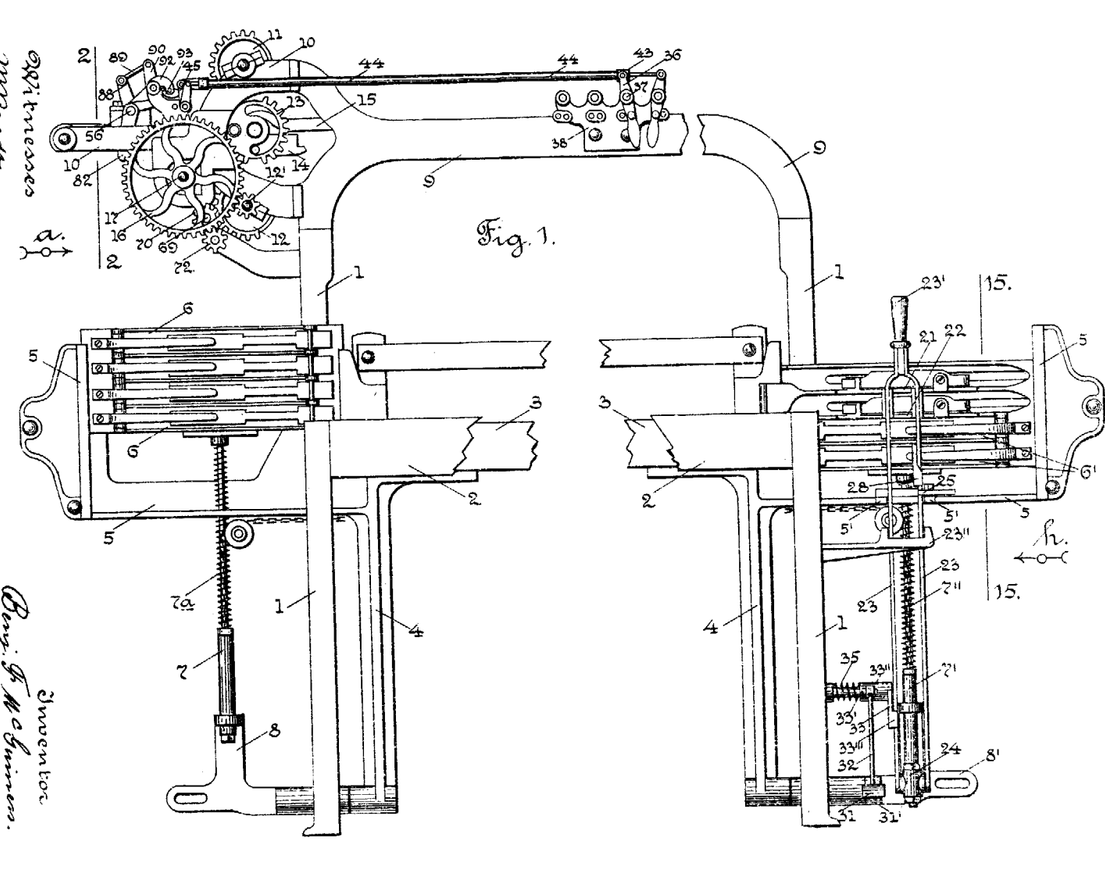
—Figure 1 is a front view of portions of a loom of the class referred to, with my improvements in shuttle changing mechanism, and indicating mechanism applied thereto. The loom is broken out through the central portion thereof.

Instead of operating the lever 23 by hand as above described, to move the supplemental shuttle-boxes 21 and 22 into operative position, and to connect them with the ordinary shuttle-boxes 6', I may use a foot treadle mechanism, shown in Figs. 1, 15, and 16, consisting of a foot treadle or lever 31, having a hub 31' loosely mounted on the rocker iron pivot stud, and connected by a link 32 to an extension 33' on the hub 33" of an arm 33, pivotally mounted on a stud 34 secured to the loom frame 1, see Fig. 1. The arm 33 has a side extension 33''' thereon, which is adapted to engage the rear edge of the lever 23, see Fig. 1, when the treadle mechanism is operated by the weaver, and move forward said lever 23, and the supplemental shuttle-boxes 21 and 22 thereon, into their operative position. A helically coiled tension spring 35, secured at one end, and attached at its other end to the hub 33" of the arm 33, acts to return said arm and the treadle mechanism to its normal position, after the weaver has removed his foot from the treadle. After the weaver has moved forward the lever 23, having the supplemental shuttle-boxes or cells 21 and 22 thereon, to cause them to be connected with the ordinary drop boxes 6', the weaver then has to indicate, through indicating mechanism, the shuttle-box which contains the shuttle to be exchanged for a new shuttle, and through indicating surfaces on the box pattern chain, the movement of the movable or sliding runs on the vibrator levers is caused to take place, through their operating mechanism, to bring the lower supplemental shuttle-box or cell 22 on a line with the race-way of the lay at the proper time, to receive the shuttle to be removed, and when the new shuttle is called by the pattern surface, bring the upper shuttle-box or cell 21 having the spare shuttle therein, on a line with the race-way, to allow the shuttle therein to be thrown across the lay into its shuttle box on the other end of the lay, and then the loom continues to operate in the normal way without stopping, and the lever 23, and boxes 21 and 22 thereon, are automatically moved into their forward inoperative position on the forward beat of the lay.

I will now describe my indicating mechanism, and the mechanism connected therewith for operating the sliding runs on the vibrator levers, to cause a change of shuttles. In this instance I have shown my indicating mechanism, and the shuttle changing mechanism, for two ordinary drop shuttle-boxes at one end of the lay, and one box at the other end of the lay, and as the indicating mechanism for each box is simply duplicated, it will only be necessary to describe one mechanism. In this instance I have located the indicating mechanism, operated by the weaver, on the front loom arch, preferably about the central portion thereof. The indicating mechanism in this instance consists of a hand-operated lever 36, having its hub 36', see Figs. 8, and 10, pivotally mounted on a stud 37 secured in the upper part of a stand 38, bolted to the front loom arch. The lever 36 has its lower handle portion in this instance provided with a locking device to hold said lever in its two extreme positions; said locking device consists in this instance of a pin 39 extending loosely through a hole in the lever 36, with its inner beveled end adapted to enter a recess or depression 38' in the stand 38, and its outer end connected with one end of a spring actuated finger 40, which is pivotally mounted on the lever 36, and is operated by a helically coiled expansion spring 41, to act to move inwardly the pin 39, but when pressed toward the lever 36 at its engaging end, will compress the spring 41, and withdraw the pin 39 from a hole 38' in the stand 38. Any other suitable locking device for holding the lever 36 in its two extreme positions may be employed if desired.

Figures 8, 9, 10:
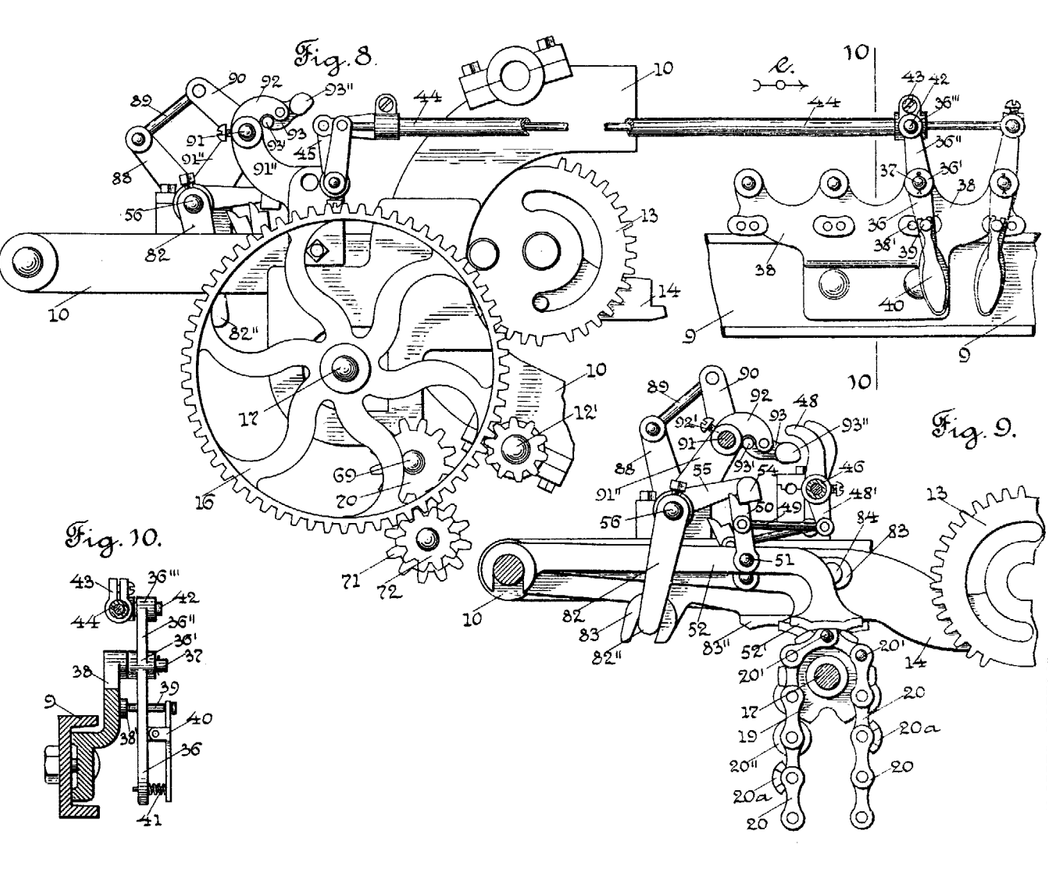
Fig. 8 shows, on an enlarged scale, some of the parts shown in the upper part of Fig. 1, in a different position.
Fig. 9 shows some of the parts shown in Fig. 6 in a different position.
Fig. 10 is a section, on line 10, 10, Fig. 8, looking in the direction of arrow e, same figure.

The lever 36 has an extension 36'' on its hub 36', which has a hub or boss 36''' thereon to receive a stud 42 extending out from a split collar 43 secured on one end of a connector 44, in this instance made of tubular shape, see Fig. 10. The other end of the connector 44 is connected by an arm 45, with a rock shaft 46, in this instance made tubular, and mounted in suitable bearings, see Fig. 2. Fast on the shaft 46 is an arm 48, see Fig. 6, which has a downwardly extending projection 48' thereon, which is connected by a link 49 to an upright latch 50, notched at its upper end, and pivotally mounted at its lower end on a stud 51 on the pattern indicating lever 52, which is pivotally mounted at its outer end, and has a foot 52' thereon, which is adapted to extend over and be in the path of, and be engaged by the extended end of one of the bars 20' making up the pattern chain 20, see Figs. 2 and 6. The upper notched end of the latch 50 extends under a bar 54, see Fig. 3, which is supported in this instance on arms 55, the hubs 55' of which are loosely mounted on a shaft 56. The bar 54 has attached to one end thereof the upper end of a link or connector 57, see Figs. 3, and 4, and the lower end of said link or connector 57 is pivotally attached to a pin 58 on an arm 59, the hub 59' of which is fast on a rock shaft 60, mounted in a bearing 61' on an arm 61, see Fig. 4. The opposite end of the shaft 60 has fast thereon the hub 62' of an arm 62, and the upper end of the arm 62 is connected by a link 63, see Fig. 2, with a stud or screw 64'', in this instance on the hub 64' of an arm 64 fast on the sliding rod 65, having the expansion spring 65' thereon. Said arm has a fork or yoke shaped end to extend in an annular groove 66' in the hub of the pin wheel 66, which is splined on the extended hub 67' of the pinion 67, loosely mounted on a shaft 68. The pinion 67 meshes with and is driven by a pinion, not shown, fast on a shaft 69, see Fig. 2, which extends through to the front of the head motion, and has a pinion 70 thereon, which meshes with and is driven by a pinion 71, which is connected with and is driven by a pinion 72, which meshes with and is driven by the pattern chain shaft gear 16, see Figs. 1, 2, and 8. The pin wheel 66 has two pins 66'' thereon, which are adapted to be moved into and out of engagement with the star wheel 73, having its hub loosely mounted on the pattern chain cylinder shaft 17. The star wheel 73 has in this instance fast on its hub, or made a part thereof, a plate or disk 73', having concaved portions on its periphery, corresponding to the curvature of the periphery of the pin wheel 66. This plate or disk 73' acts as a lock, to prevent the pin wheel 66 from moving out of engagement with the star wheel 73, after the pin wheel is moved into its operative position, and until it is ready to be disengaged from the star wheel, when the recesses in the plate 73' will be in proper position relative to the pin wheel 66, to allow the pin wheel to be moved away from the star wheel 73, and pass by one of the concaved recesses in the periphery of the plate 73'. When the pin wheel 66 is moved forward into operative position, it will pass by one of the concaved recesses in the periphery of the plate 73'. The star wheel 73, loose on the pattern chain cylinder shaft 17, is connected with and rotates in this instance a double cam 74, which is loose on the shaft 17. The cam 74 is shown detached in Figs. 5, and 5ª; said cam 74 has a cam groove 74' in one face thereof, see Fig. 5, to receive a stud or roll 75' on a cam lever 75. The cam groove 74' is so shaped, that a one-half revolution of the cam 74, will move the cam lever 75 out and in, to cause the sliding run on the vibrator lever, to be hereinafter described, with which it is connected, to be moved away from the box pattern chain, and be returned to its normal position over the box pattern chain. The cam 74 has a cam groove 74'' on its other face, see Fig. 5ª, to receive a stud or roll 76' on a cam lever 76. The cam groove 74'' is so shaped, that a one-fourth revolution of the cam 74, will move the cam lever 76 out and in, to cause the sliding run on the vibrator lever, to be hereinafter described, with which it is connected, to be moved away from the box pattern chain, and be returned to its normal position over the box pattern chain.

Figures 2, 3:
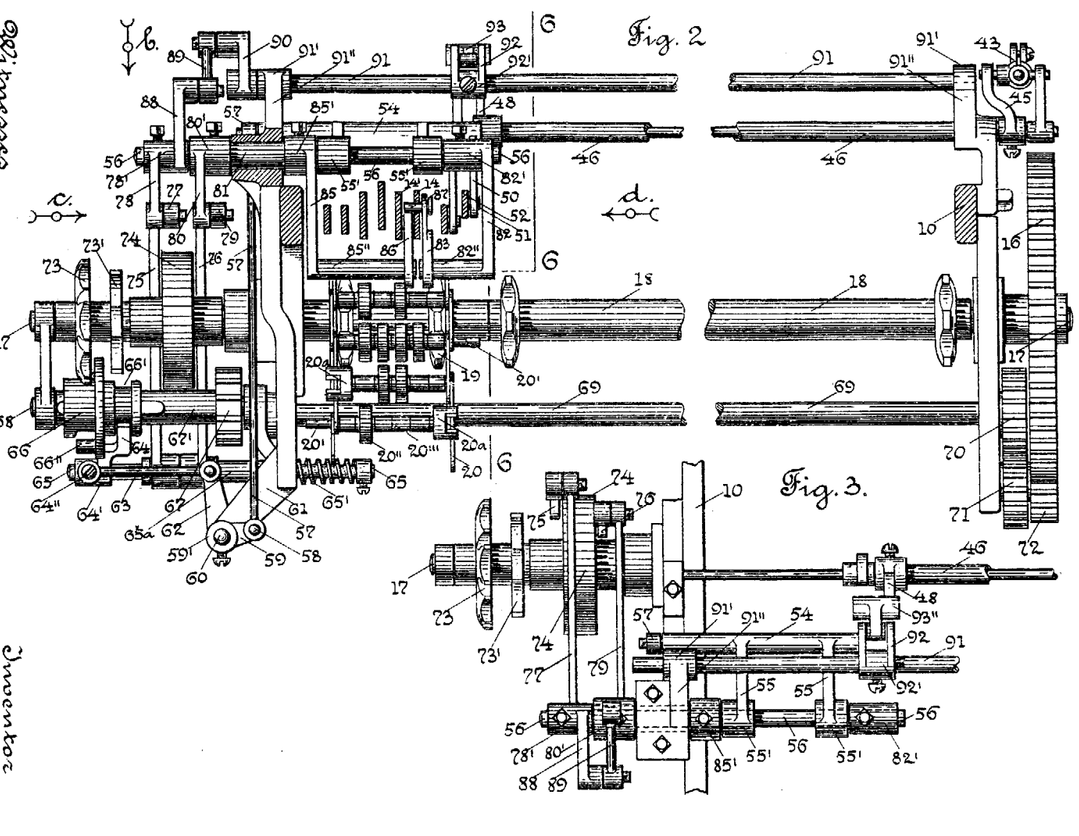
Fig. 2 is, on an enlarged scale, a section, on line 2, 2, Fig. 1, looking in the direction of arrow a, same figure; some of the parts shown in Fig. 1, are left off in this figure for the sake of clearness.
Fig. 3 is a plan view of some of the parts shown at the left in Fig. 2, looking in the direction of arrow b, same figure.

The hubs 75ª and 76ª of the cam levers 75 and 76, see Fig. 2, are loosely mounted on a hollow stud 65ª, carrying the longitudinally moving rod 65. The pin wheel 66 moves the star wheel 73, by the two pins 66'' on said pin wheel 66, and also moves the cam 74, one-fourth of its revolution to operate the cam lever 75 once, and the cam lever 76 twice, during a quarter revolution of the cam 74. The cam lever 75 is connected by a link 77, see Fig. 4, with a lever 78, the hub 78' of which is fast on a rock shaft 56, see Fig. 2, mounted in suitable bearings, and the other cam lever 76 is connected by a link 79 with an arm 80, the hub 80' of which is fast on a sleeve 81 loose on the shaft 56, see Fig. 2. On the inner end of the shaft 56 is fast the hub 82' of an arm 82, which has a rounded side extension 82'', see Fig. 2, on the end thereof, which extends into the open slotted end on the sliding run 83 carried on a vibrator lever 14, see Fig. 12, and which in this instance is attached to said lever 14 to move longitudinally thereon, by headed bolts 84 extending through elongated openings 83' in the movable or sliding run 83. The run 83 has a foot 83'' thereon, adapted to extend over and be engaged by the box pattern chain 20. The sleeve 81, loose on the shaft 56, has fast thereon the hub 85' of an arm 85, which has a rounded side extension 85'' thereon, see Fig. 2, which is adapted to extend into an open end slot on a sliding run 86, attached to a second vibrator lever 14', see Fig. 11, in the same manner as the sliding run 83 is attached to the vibrator lever 14, and having a foot 86'' thereon, adapted to extend over and be engaged by the pattern chain 20. The outer upper edge of the sliding run 86 is made inclined or cam shape, to engage a stud or pin 87 extending out from one side of the run 83, see Fig. 2, and through an elongated slot in the vibrator lever 14, and raise the sliding run 83, when the sliding run 86 is moved outwardly, as shown in Fig. 11.

Figure 11:
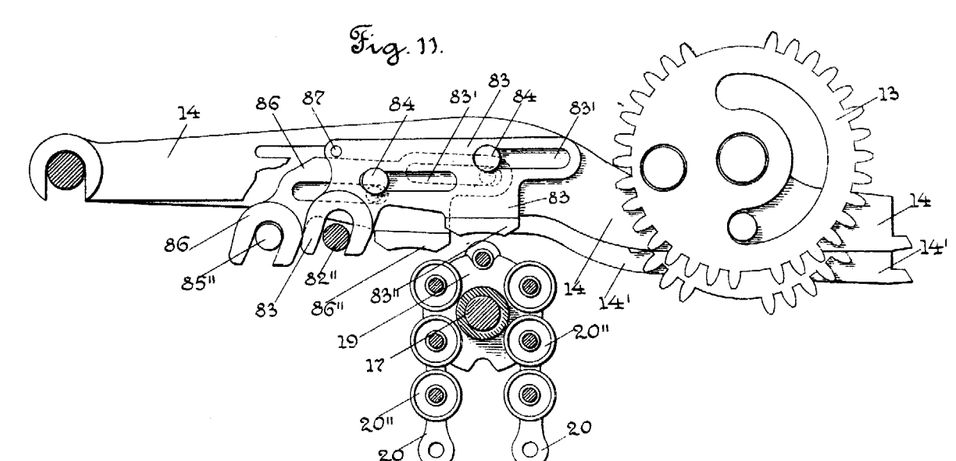
Fig. 11 shows two shuttle-box vibrator levers with sliding runs, and the vibrator gears thereon, and their pattern chain, detached.

In Fig. 11 the second sliding run 86 is shown as moved to the left, or away from the pattern chain 20, thus lowering the vibrator lever 14' on which it is mounted, and by reason of the engagement of the sliding run 86 with the pin 87 on the sliding run 83, the vibrator lever 14 on which the sliding run 83 is mounted, is raised; this raising of the vibrator lever 14 on which the sliding run 83 is mounted causes the lower box 22 of the supplemental boxes, to be moved to the level of the race-way of the lay, as shown in Fig. 1, to receive the shuttle to be exchanged when it is thrown from the other side of the loom.

Figure 12:
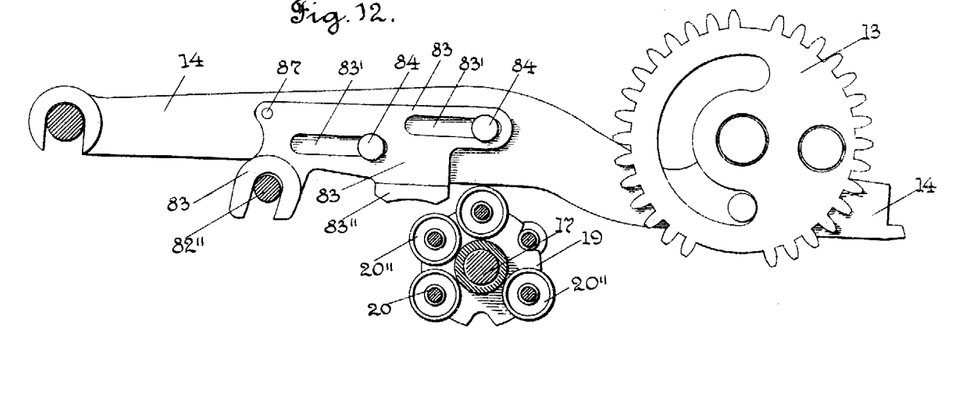
Fig. 12 corresponds to Fig. 11, but shows some of the parts in a different position.

In Fig. 12, both sliding runs 83 and 86 are shown moved to the left, and away from the pattern chain 20, allowing both vibrator levers 14 and 14' to be dropped, and cause the upper shuttle-box or cell 21 of the two supplemental shuttle-boxes or cells, to be moved to the line of the race-way, and allow the spare shuttle therein to be thrown across the race-way and into its shuttle-box on the other end of the lay. After the spare shuttle has been thrown across the lay, both the sliding runs 83 and 86 are moved back into their normal position over the pattern chain, to operate, through the movement of the vibrator levers, the ordinary shuttle-boxes in the usual way, and the raising of the two ordinary shuttle-boxes 6' at the right hand end of the loom, to bring the upper box 6' on a line with the race-way of the lay, will, through the release of the spring latch 25 from engagement with the swinging lever 23, by the engagement of the enlarged or cam-shaped end 28' on the arm 28 with the latch 25, allow the swinging lever 23, as the lay moves forward, to be moved backward or toward the front of the lay, as shown by broken lines in Fig. 16, and remain in that position by gravity, moving up and down with the ordinary shuttle-boxes 6', until the weaver again moves it into engagement with said boxes, for another change of shuttles, either by the foot treadle mechanism, or by hand.

Figures 4, 5, 5A:
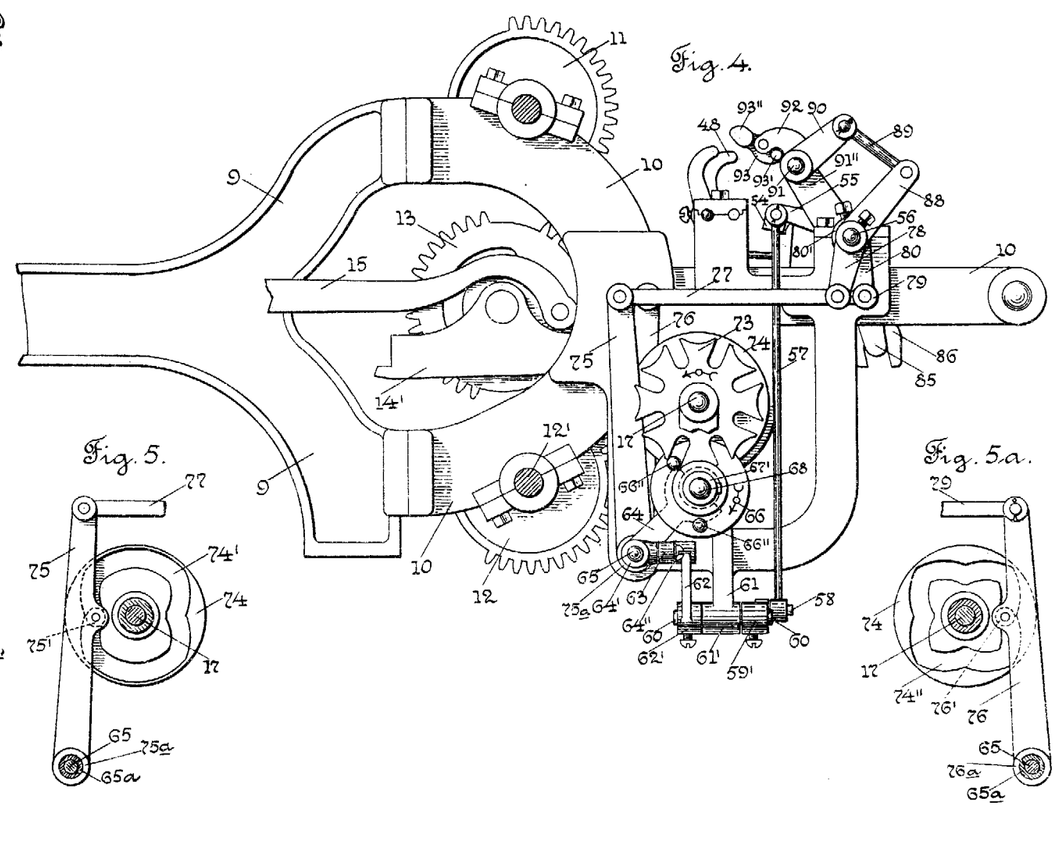
Fig. 4 is an end view of the parts shown in Fig. 2, looking in the direction of arrow c, same figure; some parts are shown in this figure which are not shown in Fig. 2.
Fig. 5 is a detached view of the cam, and cam lever shown in Fig. 4, showing the cam groove on one side of the cam.

On the rock shaft 56 is fast an arm 88, see Figs. 2, and 4, which is connected by a link 89 with an arm 90 fast on a rock shaft 91, mounted in bearings 91' on stands 91'', see Fig. 2. Fast on said rock shaft 91 is the hub 92' of a forked arm 92, see Fig. 2, which has pivotally mounted, between its forked end, a latch or pawl 93, which has a projection or stud 93' on opposite sides of its inner end, and is adapted to extend into the recessed portion of the supporting arm 92, and to form a lock or stop for limiting the downward pivotal movement of said latch 93, as shown in Fig. 9. The other end of the latch 93 has a rounded or cam shaped end 93'' adapted to extend into the path of and engage the arm or lever 48, see Fig. 9, fast on the shaft 46. The rocking of the shaft 56 in one direction, through the rotation of the cam 74, and movement of the cam lever 75, to cause the outward movement of the sliding run 83 on the vibrator lever 14, as above described, will, through intermediate connections, rock the shaft 91 and arm 92 thereon, and cause the downward movement of the latch 93, back of the arm 48, on the shaft 46, see Fig. 7. The rocking of the shaft 56 in the opposite direction, by the continued rotation of the cam 74, and the movement of the cam lever 75, will raise the latch 93, and the engagement of the latch 93 with the arm 48, see Fig. 9, will move said arm 48 and rotate the shaft 46, and through the arm 48', and link 49 to the upright notched latch 50 pivoted on the indicator lever 52, move back said latch out of engagement with the bar 54, to release the bar 54 and allow it to drop, and through connections from said bar 54 to the arm 64 for operating the pin wheel 66, release the rod 65 carrying said arm, and allow the spring 65' to act, to move back the rod 65 carrying said lever, and with it the pin wheel 66 into its inoperative position. The rotation of the shaft 46, above described, will, through arm 45, and tubular connector 44 to the hand lever 36 of the indicating device, move said hand lever back to its normal position, as shown at the right in Fig. 8.

Figure 17:
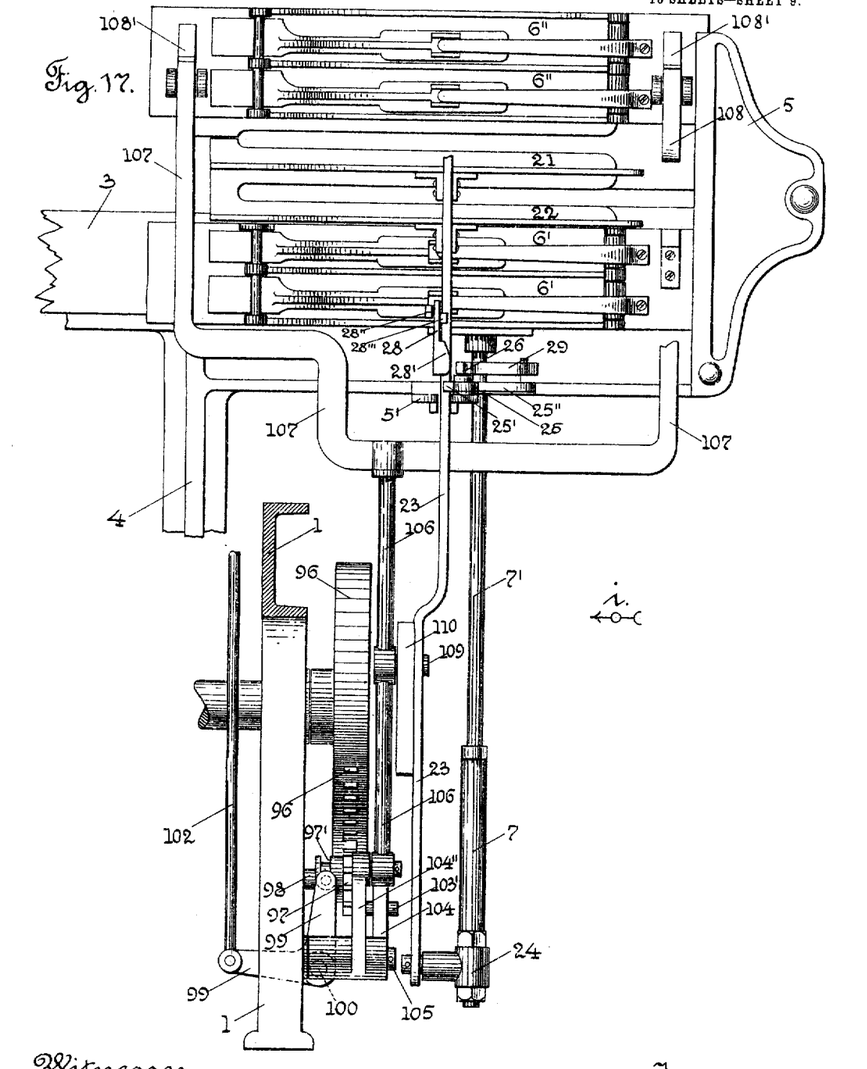
Fig. 17 is, on an enlarged scale, a front view of a modified construction of the shuttle-boxes shown at the right in Fig. 1; in this figure there are four ordinary shuttle boxes, and my two supplemental boxes.
Figures 18, 19:
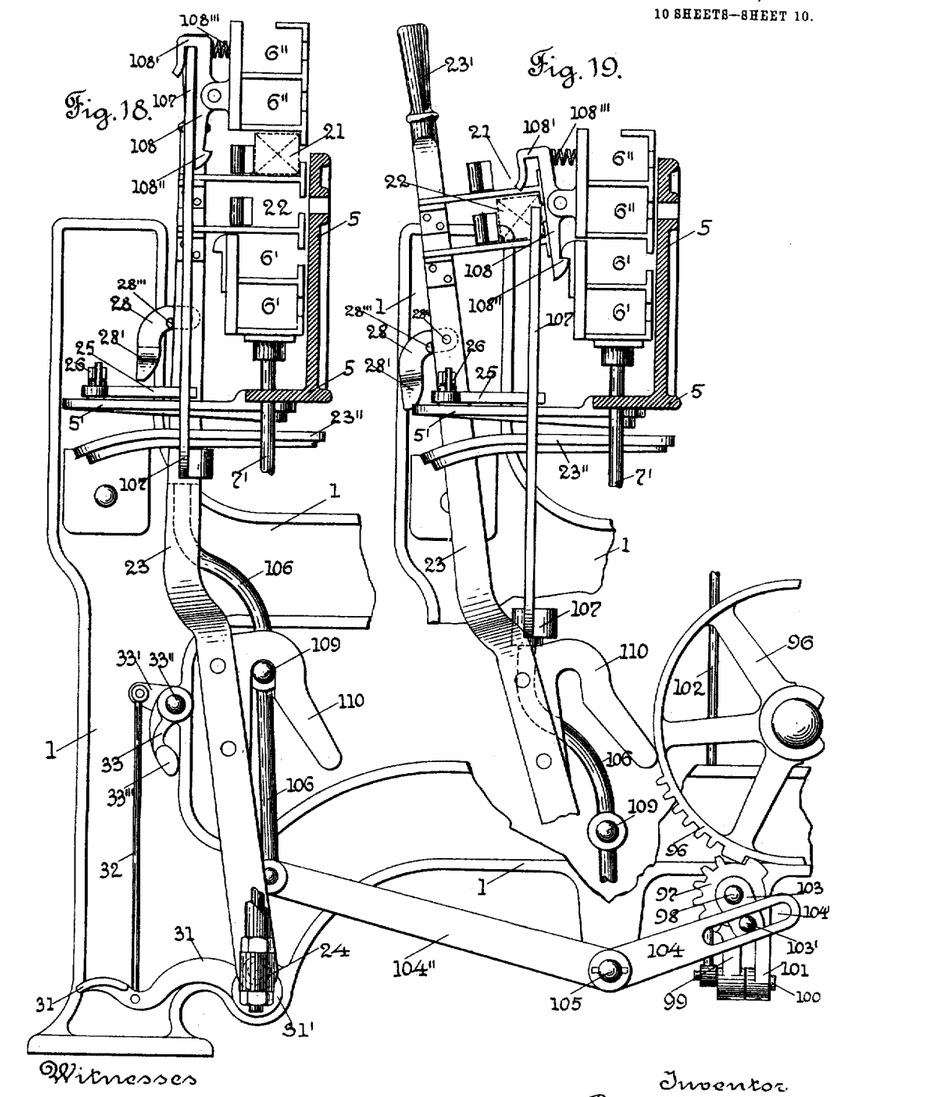
Fig. 18 is a sectional end view of the parts shown in Fig. 17, looking in the direction of arrow i, same figure.
Fig. 19 corresponds to Fig. 18, but shows some of the parts in a different position; some parts shown in Fig. 18 are left off in this figure.

In Figs. 17, 18, 19 of the drawings is shown a modified construction of the shuttle-boxes at the right hand end of the loom. In said figures are shown four ordinary shuttle-boxes, which are adapted to be divided or moved apart in pairs, to allow of the entrance of the two supplemental boxes or cells, which may be of a similar construction to the two supplemental boxes 21 and 22 hereinbefore described, and similarly mounted on a swinging lever 23. In Figs. 17 and 18, the two pairs of ordinary shuttle-boxes or cells are shown divided or moved apart, and the two supplemental shuttle-boxes locked in position between them. In Fig. 19, the two supplemental shuttle-boxes or cells are shown in their normal inoperative position, and the ordinary four shuttle-boxes or cells are shown moved together and locked in position. Parts similar to those shown in the other drawings and above described, have the same characters of reference in Figs. 17, 18, and 19, and it will only be necessary to describe the modified construction of the ordinary drop shuttle-boxes or cells, and the mechanism for moving apart the same to receive the supplemental boxes or cells. The bottom shaft of the loom has in this instance mounted thereon a mutilated or master gear 96, so-termed, which meshes with and drives a mutilated pinion 97, when said pinion, which has a sliding motion on a stationary stud 98 on the loom frame 1, see Fig. 17, is moved into the path of the teeth on the master gear 96, through the rocking motion of an angle lever 99, pivotally mounted on a stud 100, mounted on the lower end of a stationary stand 101 on the loom end or frame 1, see Fig. 19. One end of the angle lever 99 is forked shape, and has pins or rolls thereon extending into an annular groove in the hub 97' on the mutilated pinion 97. The other arm of the angle lever 99 is attached to a connector or rod 102 leading to the pattern chain, or pattern indicating mechanism, not shown, on the opposite end of the loom. A crank arm 103, having a crank pin 103' thereon, is attached to and rotates with the mutilated pinion 97. The crank pin 103' extends into an elongated opening 104' in one arm of a lever 104, centrally mounted on a stud 105'; the other arm 104'' of the lever 104 is pivotally connected to the lower end of a vertically moving rod 106, the upper end of which carries the forked frame 107, see Fig. 17. The upper ends of the frame 107 are adapted to extend into the path of and engage the upper hook ends 108' on spring actuated latch locks 108, which are pivotally mounted on the front side of the uper pair of shuttle boxes, at each end thereof, and have hooks 108'' on their lower ends, adapted to engage projections on the front side of the lower pair of shuttle-boxes at each end thereof, by the action of a spring 108''', to attach the upper pair of regular shuttle-boxes or cells to the lower pair of shuttle-boxes or cells, see Fig. 19, and cause said shuttle-boxes to move together. On the vertically moving rod 106 is a stud 109 extending out from one side thereof, in the path of and adapted to engage in its upward movement a cam-shaped arm or plate 110, secured to the swinging lever 23, see Fig. 17. A half rotation of the mutilated pinion 97 will, through the crank 103, and the crank pin 103' engaging the lever 104, rock said lever and move upwardly the vertically moving rod 106, and with it the frame 107, to cause the upper ends of said frame to engage and unlock the catches 108, and also to raise up the two upper shuttle-boxes or cells 6'', and allow the two supplemental boxes or cells 21 and 22 to move in between the two divided pairs of boxes, as shown in Fig. 18, and another half rotation of the mutilated pinion 97 will move the lever 104 in the opposite direction, and move downwardly the vertically moving rod 106, and frame 107 connected therewith, and the downward movement of the shuttle-boxes will unlock the swinging lever 23, and allow said lever, and the supplemental boxes 21 and 22 thereon, to drop back into their normal position, as shown in Fig. 19, and allow the upper two cells to drop down and be locked to the lower two cells as shown in Fig. 19. This operation will be repeated according to the pattern indicating mechanism.

From the above description in connection with the drawings, the operation of my improvements will be readily understood by those skilled in the art.

In the normal operation of the loom, the swinging lever 23, carrying the two supplemental shuttle-boxes or cells 21 and 22, is preferably disconnected from the ordinary shuttle-boxes 6' on the right hand end of the loom, and extends toward the front of the loom, in the position shown by broken lines in Fig. 16, and remains there, moving up and down with the ordinary shuttle-boxes 6' on the right hand end of the loom, as such shuttle-boxes are called during the normal operation of the loom. The relative position of the supplemental boxes 21 and 22, and the ordinary boxes 6' is always maintained, so that the supplemental shuttle-boxes 21 and 22 may always be moved into operative position over the ordinary shuttle boxes 6', without regard to the position of said boxes 6' relative to the race-way of the lay.

When the weaver sees that one of the shuttles in any one of the ordinary shuttle-boxes has its filling substantially or practically exhausted, he takes a shuttle having a corresponding filling therein, and places it in the upper supplemental box or cell 21 on the swinging lever 23, and through the handle 23', or the foot treadle mechanism, moves forward said lever 23, to bring the supplemental shuttle-boxes 21 and 22 in line with the two ordinary shuttle-boxes 6'. The supplemental shuttle-boxes 21 and 22 are locked to the two ordinary shuttle-boxes 6', by the locking mechanism which locks the lever 23 in its forward position. The weaver then operates the indicating lever 36 for the shuttle-box which contains the shuttle which is to be exchanged; the first indicating lever 36 at the right in Fig. 1, is for the top box, or box one at the left hand end of the loom; the second indicating lever 36 for box two, the third indicating lever, not shown, for box three, and the fourth indicating lever, not shown, for box four, the lowest box. The weaver moves the indicating lever 36, in this case the second lever, from its normal position, shown by the position of the first lever at the right, in Fig. 1, to its opposite position, shown by the position of the second lever at the right in Figs. 1, and 8. The movement of said lever 36 moves the tubular connector 44, and through arm 45 rocks the tubular shaft 46, and through arm 48', and link 49, Fig. 6, moves the upright latch 50, pivotally mounted on the pattern indicating lever 52, to bring it under the bar 54, see Fig. 6. As the pattern chain 20 revolves, the extended end of a bar 20' raises the pattern indicating lever 52, see Fig. 9. The raising of the lever 52, through the upright latch 50, raises the bar 54, and through link or connector 57, arm 59, rock shaft 60, arm 62, and link 63, moves the sliding rod 65, (against the action of the spring 65') carrying the arm 64, to move the pin wheel 66 into the path of the star wheel 73, see Fig. 2. The partial rotation of the pin wheel 66, through the rotation of the gear 67, will give one-eighth rotation to the star wheel 73, through the engagement therewith of one pin 66'', see Fig. 4, and also one-eighth rotation to the cam 74, and through cam lever 76, connector 79, and arm 80, rock the sleeve 81, see Fig. 2, and through arm 85, move the second sliding run 86 on its vibrator lever 14' outwardly, and away from the pattern chain 20, as shown in Fig. 11, allowing the vibrator lever 14' to drop. The outward movement of the sliding run 86, will, through the pin 87 on the sliding run 83, raise the run 83, and its vibrator lever 14, thus causing the lower supplemental box 22 to be brought on a line with the race-way, when the shuttle-box containing the shuttle to be exchanged is brought on a line with the race-way on the opposite end of the loom, and the shuttle to be exchanged enters the lower supplemental box or cell 22.

Figures 6, 7:
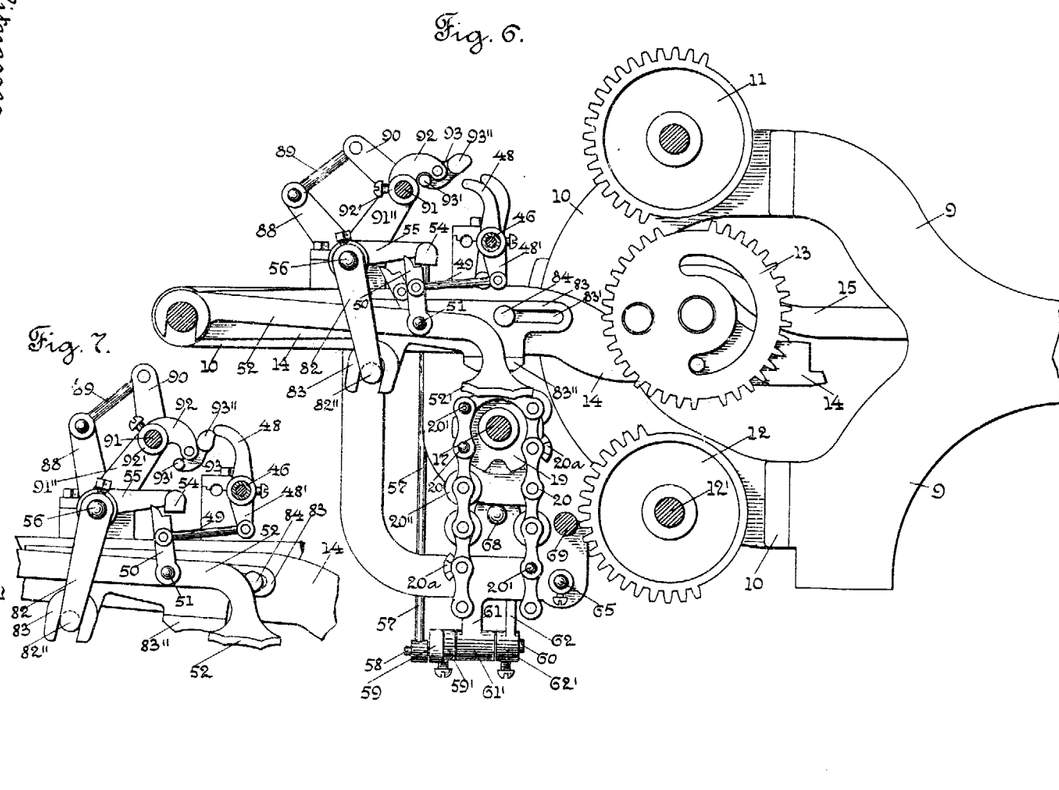
Fig. 6 is a section, on line 6, 6, Fig. 2, looking in the direction of arrow d, same figure, and showing some parts which are not shown in Fig. 2.
Fig. 7 shows some of the parts shown at the left in Fig. 6, in a different position.

The continued rotation of the star wheel 73 and the engagement of the second pin 66″ therewith will give another eighth revolution to the cam 74, driven by the pin wheel 66, and will, through cam lever 76, and connections to the sliding run 86, move said run back to its normal position over the pattern chain, and allow the run 83, and the vibrator lever 14 on which it is mounted, to drop to their normal position, shown in Fig. 6, to be acted on by the box pattern chain 20. If the spare shuttle to take the place of the spent shuttle, or the one to be exchanged, is called by the box pattern chain 20 immediately after the spent shuttle has entered the supplemental box or cell 22, then the continued rotation of the pin wheel 66, and the engagement of one pin 66″ thereon with the star wheel 73, will give a one-eighth rotation to said star wheel, and also the cam 74, and, will through cam levers 75 and 76, and connections therefrom to the sliding runs 83 and 86, move simultaneously both runs 83 and 86 outwardly and away from the box pattern chain 20, as shown in Fig. 12, to allow both vibrator levers 14 and 14′ to drop, and cause the supplemental spare shuttle box or cell 21 to be brought on a line with the race-way of the lay, to have the spare shuttle picked therefrom, and then both runs 83 and 86 are simultaneously moved back over the box pattern chain 20, by the continued revolution of the cam 74, through the rotation of the star wheel 73, by the engagement therewith of the second pin 66″ on the pin wheel 66, and the ordinary shuttle-boxes are operated by the box pattern chain 20, in the usual way.

When the sliding run 83 is moved outwardly, as above described, and away from the box pattern chain 20, the latch 93, through connections to the rocking shaft 56, is moved downwardly, and past the arm 48, fast on the rock shaft 46, see Figs. 7, and 9, and on the return movement of the sliding run 83 over the box pattern chain 20, the latch 93 is moved upwardly and engages the arm 48 on the rock shaft 46, and moves said arm 48 and rocks the shaft 46, and through arm 48′ thereon, and link 49, see Fig. 6, moves the upright latch 50 from under the bar 54, and allows said bar 54 to drop, and through connections to the lever 64, release said lever, and allow the spring 65′ to act to move the rod 65, and through arm 64 move the pin wheel 66 out of engagement with the star wheel 73, leaving said star wheel and the mechanism operated thereby at rest. The rocking of the shaft 46, as above described, will, through connections to the indicating lever 36, return said lever to its normal position, shown at the right in Fig. 1, as above described.

I have particularly described herein the operation of the indicating mechanism for the second box of the four shuttle-boxes 6 at the left hand end of the loom, but the operation of the indicating mechanism for each of the other three boxes 6 is of the same construction and operation.

In Fig. 2 is shown on the right of the pattern chain 20, an extended bar 20′ for the pattern indicator lever for one shuttle-box at the left, in this instance box number two, and on said pattern chain is also shown a half ball 20ᵃ for a second indicator lever, located on the inside of the other pattern indicator lever, for the upper box. On the opposite edge of the pattern chain 20 is an extended bar 20′, shown in Fig. 2, for a third indicator lever for box number three, and also a half ball 20ᵃ for a fourth indicator lever for box number four. At the front of the loom, on the arch, there is an indicating lever for each box, and the connectors from two levers are preferably made as a tube, and as a rod extending within the tube, and a second rod, and a tube, not shown, are used for the other two indicating levers, not shown, and are connected with and operate a mechanism similar to, and a duplicate of the mechanism shown in the drawings.

My improvements are adapted to be used on looms of the class referred to, having one or more drop or change shuttle boxes or cells on one, or both ends of the loom.

It will be understood that the details of construction of my improvements may be varied if desired. Instead of a pivoted lever 36 for the indicating mechanism, I may use a slide, or a rotatable handle, or wheel. Instead of two ordinary boxes 6′, at the right hand end of the loom, only one ordinary box may be used. The supplemental boxes or cells 21 and 22 may be located on the left hand end of the loom, instead of on the right hand end. In connection with my improvements applied to, or used on a loom, any of the ordinary motions or mechanisms may be used on the same loom, for example a warp stop motion.

Having thus described my invention, what I claim as new and desire to secure by Letters Patent is:—

1. In a loom of the class described, the combination with the head motion, comprising upper and lower cylinder gears, intermediate vibrator gears, vibrator levers, and a box pattern chain for operating said levers, of movable runs on said vibrator levers, manually operated mechanism to indicate the shuttle to be exchanged, and mechanism for moving said movable runs to cause the operation of the shuttle replenishing mechanism.

2. In a loom, the combination with the shuttle box operating mechanism, comprising upper and lower cylinder gears, intermediate vibrator gears, vibrator levers, pattern mechanism for said levers, and one or more ordinary shuttle boxes, at one or both ends of the loom, of two supplemental boxes at one end of the loom, one box for a spare shuttle, and the other box to receive the shuttle to be exchanged, movable runs on the vibrator levers, manually operated mechanism to indicate the shuttle to be exchanged, and mechanism for moving said runs to cause the operation of the shuttle replenishing mechanism.

3. In a loom of the class described, in combination, shuttle box operating mechanism, comprising upper and lower cylinder gears, intermediate vibrator gears, vibrator levers, box pattern chain for operating said levers, movable runs on said vibrator levers, one or more ordinary drop or change shuttle boxes at one or both ends of the loom, two supplemental boxes at one end of the loom, one box for the shuttle to be exchanged, and the other for a spare shuttle, manually operated mechanism to indicate the shuttle box of the shuttle to be exchanged, and mechanism, the action of which is controlled by the indicating mechanism, to move said runs on the vibrator levers, and cause the operation of the shuttle replenishing mechanism.

4. In a weft-replenishing loom, the combination with one or more ordinary drop boxes at one end of the loom, of two supplemental boxes, one over the other at the same end of the loom, said supplemental boxes made separate from said ordinary box or boxes, and adapted to be moved into and out of vertical alinement therewith.

5. In a weft-replenishing loom, the combination with one or more drop boxes, at one end of the loom, of two supplemental boxes, one over the other at the same end of the loom, said supplemental boxes made separate from said ordinary drop box or boxes, and adapted to be moved into and out of vertical alinement therewith, and means for supporting and for moving said supplemental boxes into and out of alinement with the ordinary box or boxes.

6. In a weft-replenishing loom, the combination with one or more drop boxes at one end of the loom, of two supplemental boxes, one over the other, said supplemental boxes made separate from the ordinary drop box or boxes, and adapted to be moved into and out of vertical alinement therewith, and means for supporting and for moving said supplemental boxes into and out of alinement with the ordinary box or boxes, and means for locking the same in operative position relative to the ordinary box or boxes.

7. In a weft-replenishing loom, the combination with one or more drop boxes at one end of the loom, of two supplemental boxes, one over the other, and adapted to be moved into alinement with the ordinary boxes, a swinging lever carrying said supplemental boxes, and means for locking said supplemental boxes in alinement with the ordinary box or boxes.

8. In a weft-replenishing loom, the combination with one or more drop boxes at one end of the loom, of two supplemental boxes, one over the other, and adapted to be moved into alinement with the regular boxes, a swinging lever carrying said supplemental boxes, and means for locking said lever to hold the supplemental boxes in alinement with the ordinary box or boxes, and means for automatically releasing said lever from its locked position, so that it may be returned to its inoperative position.

9. In a weft-replenishing loom, the combination with one or more drop boxes at one end of the loom, of two supplemental boxes, one over the other, a swinging lever carrying said supplemental boxes, and adapted to be moved to bring the supplemental boxes in alinement with the ordinary box or boxes, and means for locking said lever, and means for automatically releasing said lever from its locked position so that it may be returned to its inoperative position.

10. In a weft-replenishing loom, the combination with two or more drop boxes, which are adapted to be moved apart vertically, and means for moving apart said shuttle boxes at predetermined times, and allowing them to be moved together, of two supplemental boxes, one over the other, and adapted to be moved in between the separated boxes, and in vertical alinement therewith, and means for supporting and for moving said supplemental boxes into and out of alinement with the ordinary boxes.

11. In a loom of the class described, manually operated indicating mechanism to indicate for an exchange of a shuttle, comprising a manually operated device located at the front of the loom, connections intermediate said device and two movable runs on two levers operated by a pattern surface, and said pattern surface and said runs, adapted to be moved into the path of said pattern surface, and out of the path of said pattern surface to cause the operation of the shuttle replenishing mechanism.

12. In a loom having two or more drop or change shuttle boxes at one end, manually operated indicating mechanism to indicate for an exchange of a shuttle in either box, comprising a manually operated device, a connector from said device to mechanism for operating two movable runs, and said mechanism, and said runs, each mounted on, and movable on a pattern lever, and one of said runs adapted to engage and move the other run, and said movable runs adapted to be moved into the path of a pattern surface and said pattern surface, and moved out of the path of said pattern surface to cause the operation of the shuttle replenishing mechanism.

13. In a loom, manually operated indicating mechanism to indicate for an exchange of a shuttle, comprising a device located at the front of the loom, connections intermediate said device and two movable runs on pattern levers, and said pattern levers and said movable runs adapted to be moved into the path of a pattern surface, and said pattern surface, and out of the path of said pattern surface, and means for moving said movable runs into and out of operative position relative to said pattern surface, to cause the operation of the shuttle replenishing mechanism, said means comprising a star and pin wheel mechanism, a cam, and connections intermediate said cam and the sliding runs.

14. In a loom of the class described, manually operated indicating mechanism to indicate for an exchange of a shuttle, comprising a hand lever or device, connections intermediate said device and movable runs on pattern levers, and said pattern levers and said runs, adapted to be moved into the path of a pattern surface, and said pattern surface and out of the path of said pattern surface, to cause the operation of the shuttle replenishing mechanism, and means for moving said runs into and out of operative position relative to said pattern surface, said means comprising a star wheel and pin wheel mechanism, a cam, and connections intermediate said cam and said runs, and means for moving the pin wheel into and out of engagement with the star wheel, the operation of said means controlled by a pattern lever and a pattern surface.

15. In a loom of the class described, manually operated indicating mechanism to indicate for an exchange of a shuttle, comprising a hand lever or device, connections intermediate said device and movable runs on a pattern lever, and said pattern lever and said sliding runs, adapted to be moved into the path of a pattern surface, and said pattern surface, and out of the path of said pattern surface, and means for moving said runs into and out of operative position relative to said pattern surface, to cause the operation of the shuttle replenishing mechanism, said means comprising a star wheel and pin wheel mechanism, a cam, and connections intermediate said cam and said runs, and means for positively moving the pin wheel into engagement with the star wheel, the operation of said means controlled by a pattern indicator lever, and a pattern surface, and non-positive means for moving the pin wheel out of engagement with the star wheel.

16. In a loom of the class described, having a plurality of drop or change shuttle boxes at one or both ends, manually operated indicating mechanism, and mechanism connected therewith, comprising a hand lever or device, connections to a rock shaft, and said shaft, connections therefrom to a pivoted latch, and said latch, mounted on a pattern lever and adapted to be moved into and out of engagement with a movable bar, and said pattern lever and said bar, and connections intermediate said bar and a driven pin wheel, to positively move said pin wheel into engagement with a star wheel, and said pin wheel and star wheel, a cam operated thereby, and connections from said cam to movable runs on pattern indicator levers, and said runs and pattern indicator-levers, to move said runs into and out of operative position relatively to a pattern surface and cause the operation of the shuttle replenishing mechanism.

BENJ. F. McGUINESS.

Witnesses:
MINNA HAAS,
JOHN C. DEWEY.